US010846929B2

(12) United States Patent
Sugaya

(10) Patent No.: US 10,846,929 B2
(45) Date of Patent: Nov. 24, 2020

(54) INFORMATION PROCESSING APPARATUS AND CONTROL METHOD OF DISPLAY APPARATUS

(71) Applicant: CANON KABUSHIKI KAISHA, Tokyo (JP)

(72) Inventor: Satoshi Sugaya, Kitsuki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/243,819

(22) Filed: Jan. 9, 2019

(65) Prior Publication Data

US 2019/0221037 A1   Jul. 18, 2019

(30) Foreign Application Priority Data

Jan. 18, 2018   (JP) .................................. 2018-006044

(51) Int. Cl.
G05B 19/4069   (2006.01)
G06T 19/00   (2011.01)
G06T 13/20   (2011.01)
B25J 9/16   (2006.01)
G05B 19/4061   (2006.01)

(52) U.S. Cl.
CPC ............. *G06T 19/003* (2013.01); *B25J 9/163* (2013.01); *B25J 9/1671* (2013.01); *G05B 19/4061* (2013.01); *G05B 19/4069* (2013.01); *G06T 13/20* (2013.01); *G05B 2219/40317* (2013.01); *G06T 2200/04* (2013.01); *G06T 2200/24* (2013.01)

(58) Field of Classification Search
CPC ... G06T 19/003; G06T 13/20; G06T 2200/04; G06T 2200/24; B25J 9/163; B25J 9/1671
See application file for complete search history.

(56) References Cited

U.S. PATENT DOCUMENTS

| 9,278,449 B1* | 3/2016 | Linnell | ..................... B25J 9/163 |
| 10,011,011 B2 | 7/2018 | Sugaya | |
| 2014/0025192 A1* | 1/2014 | Seya | ................... G05B 19/4063 700/174 |
| 2016/0332297 A1* | 11/2016 | Sugaya | ..................... B25J 9/161 |
| 2018/0264646 A1 | 9/2018 | Sugaya | |

FOREIGN PATENT DOCUMENTS

JP   2013-136123   7/2013
JP   2013-136123   11/2013

OTHER PUBLICATIONS

European Search Report dated Jul. 2, 2019 during prosecution of related European application No. 19152021.2.

* cited by examiner

*Primary Examiner* — Yu Chen
(74) *Attorney, Agent, or Firm* — Venable LLP

(57) ABSTRACT

An information processing apparatus includes a display controller configured to output display information to be displayed on a display apparatus, and an analysis unit. The display apparatus includes an operation display area displaying an operation of a robotic system based on robot control data and an information display area displaying information related to an operation parameter of the robotic system in a time-series manner based on the robot control data. The analysis unit is configured to analyze the operation parameter to specify a warning event. The display controller displays the wanting event specified by the analysis unit in the operation display area and the information display area in association with each other.

9 Claims, 13 Drawing Sheets

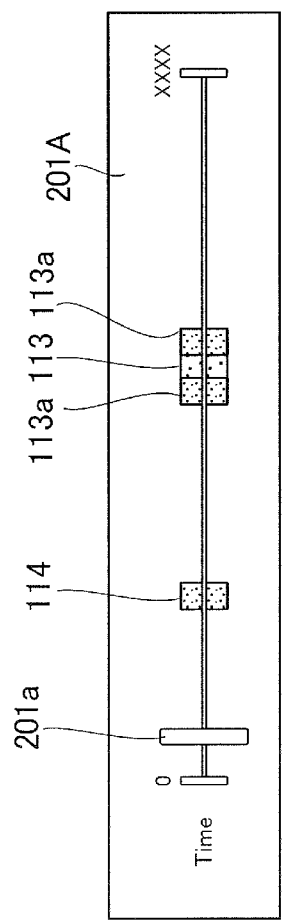
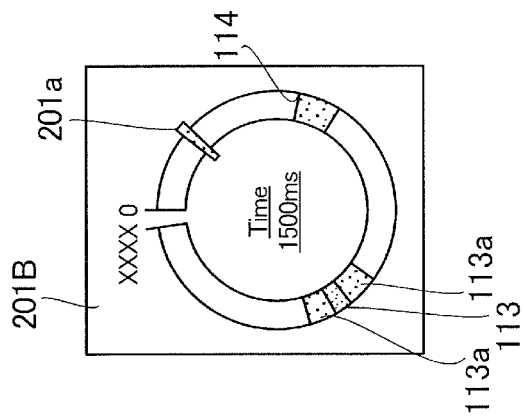
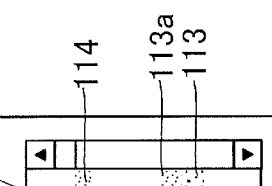
FIG.6A
FIG.6B
FIG.6C
FIG.6D

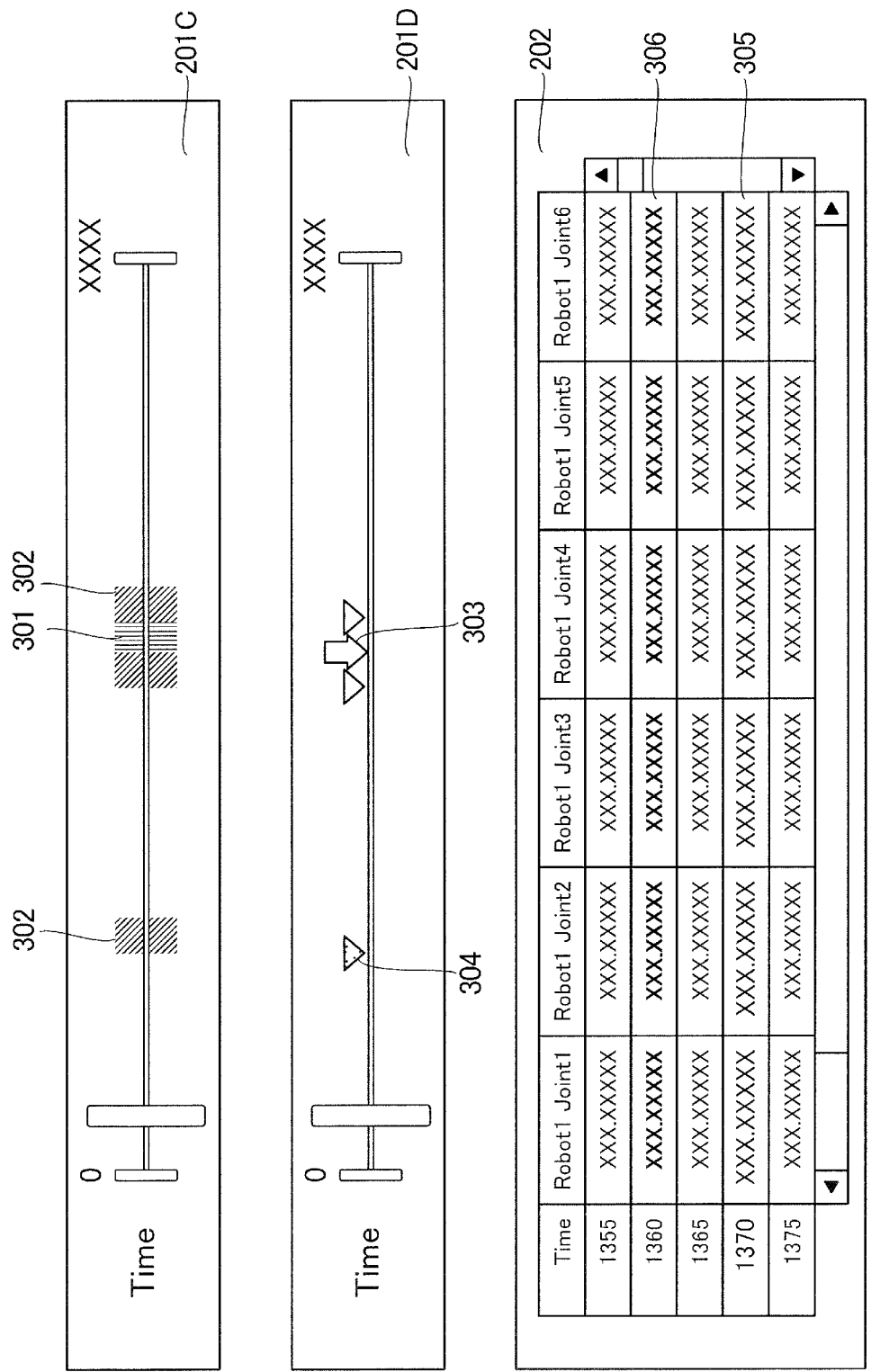

INFORMATION PROCESSING APPARATUS AND CONTROL METHOD OF DISPLAY APPARATUS

BACKGROUND OF THE INVENTION

Field of the Invention

The present invention relates to an information processing apparatus outputting display information to a display apparatus and a control method of the display apparatus.

Description of the Related Art

In a case where a work is conducted by using a robot, an obstacle such as a tool, an adjacent robot and a wall exist around the robot in general. Therefore, there is a possibility that the robot causes a trouble such as interfere, collision and contact with such obstacles. It is not easy to confirm whether the robot can be operated without causing such troubles as the interference, collision and contact by an actual machine. Due to that, a simulator that enables to verify an operation of the robot in a virtual space is often used. The simulator of this sort operates a 3D model prepared based on a structure and sizes of an actual machine within the virtual space by using teaching point data and a robot program equal to those used for the actual machine. Then, it is possible to verify the operation of the 3D model such as conveyance and assembly of works by displaying its state on a display in a mode of 3D animation for example.

The use of such simulator enables to confirm whether the robot may cause such troubles as the interference, collision and contact and to correct the specific operation of the robot that may cause such troubles without using the actual machine. Detection of such troubles as the interference, collision and contact is made by moving an interference monitoring task that discriminates a positional relationship of the 3D models such as the robot and the obstacle within the virtual space and by judging whether the models of the robot and the obstacle, that should not interfere with each other, occupy a same space.

If the interference monitoring task detects such troubles as the interference, collision and contact, a condition of the detected interference is displayed on a display that displays the 3D model to inform a user of the trouble. What is generally implemented as a display method of this time is to change a display color of the entire 3D model or of a part concerned causing such troubles as the interference, collision and contact within the virtual space as disclosed in Japanese Patent Laid-open No. 2013-136123 for example.

The user can readily confirm such state by the prior art configuration that changes the display color of the 3D model or of the part concerned corresponding to the occurrence of the interference for example as described above in a case where the interference occurs in a stationary condition or the 3D virtual display is a still image. However, in a case where the 3D model is displayed by animation (moving image) such that the 3D model is operated continuously within a virtual display, it is sometimes difficult to visually recognize the interference and to intuitively judge whether the interference is occurring.

Still further, even if the user confirms the interference state while displaying the animation (moving image) of the 3D model and operates to immediately stop the animation, there is a case where the animation display stops at a position advanced from the display of the timing concerned. In such a case, it is unable to display the timing of the occurrence of the interference without making such operation as feeding display frames in a direction of the past. It is also cumbersome to make GUI (graphical user interface) of this sort in general. In a case of using the animation (moving image) display in order to display a virtual environment in particular, there is a case where it is difficult to verify the condition by the display screen in a case where the interference occurs instantly only in one frame or in a case where the interference occurs in a shadow point where the robot overlaps with another 3D model. While it is conceivable to adopt a method of feeding the frames of the operations of the 3D model back and forth one by one in order to prevent from missing confirmation, if it takes a long takt time for the verification works, it takes a lot of man-hours for the confirmation and may not be efficient.

SUMMARY OF THE INVENTION

According to a first aspect of the present invention, an information processing apparatus includes a display controller configured to output display information to be displayed on a display apparatus, the display apparatus having an operation display area displaying an operation of a robotic system which is simulatively operated within a virtual environment based on robot control data and an information display area displaying information related to an operation parameter of the robotic system in a time-series manner based on the robot control data, and an analysis unit configured to analyze the operation parameter to specify a warning event. The display controller displays the warning event specified by the analysis unit in the operation display area and the information display area in association with each other.

According to a second aspect of the present invention, a control method of a display apparatus displaying a model of a robotic system operated in a virtual environment by operating the model simulating the robotic system based on robot control data includes displaying information related to an operation parameter of the robotic system based on the robot control data in a time-series manner, analyzing the operation parameter to specify a warning event, and displaying the specified warning event at a position on a time base of the information related to the operation parameter of the robotic system displayed in the time-series manner.

Further features of the present invention will become apparent from the following description of exemplary embodiments with reference to the attached drawings.

BRIEF DESCRIPTION OF THE DRAWINGS

FIG. 6A illustrates an event display area consisted of a linear slider display.

FIG. 6B illustrates an event display area consisted of a ringed slider display.

FIG. 6C illustrates an event display area having a display manner of a table format.

FIG. 6D illustrates an event display area having a display manner of a program editor.

FIG. 7A illustrates an event display area highlighting a wanting event by a hatching display manner.

FIG. 7B illustrates an event display area highlighting a warning event by a mark.

FIG. 7C illustrates an event display area highlighting a wanting event by a display manner of characters.

DESCRIPTION OF THE EMBODIMENTS

Embodiments for carrying out the present disclosure will be described below with reference to the attached drawings. Note that the following configurations are exemplary configurations to the end, and a person skilled in the art may appropriately modify a detailed configuration for example within a scope not departing from a gist of the present disclosure. Numerical values adopted in the embodiments are also referential numerical values and do not limit the present disclosure.

First Embodiment

A simulator system and its control method of a first embodiment of the present disclosure will be described below with reference to FIGS. 1 through 5.

Figure 1:
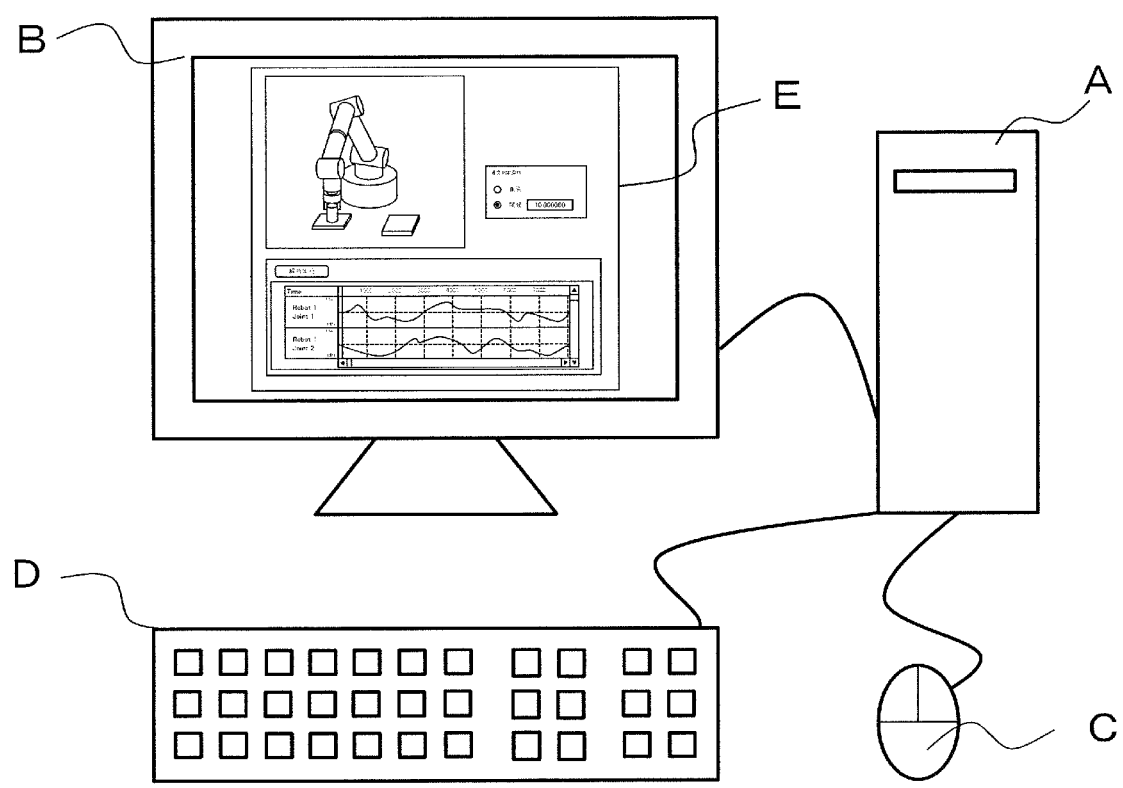
FIG. 1 illustrates a hardware configuration of a simulator system of a first embodiment of the present disclosure.

As illustrated in FIG. 1, the simulator system of the present embodiment includes a computer body A and a display B, a mouse C and a keyboard D respectively connected to the computer body A.

Simulation software E is installed on the computer body A serving as an information processing apparatus, and a screen display is made on the display B serving as a display apparatus. FIG. 1 illustrates a part corresponding to the screen display of the simulation software E on the display B.

Figure 2:
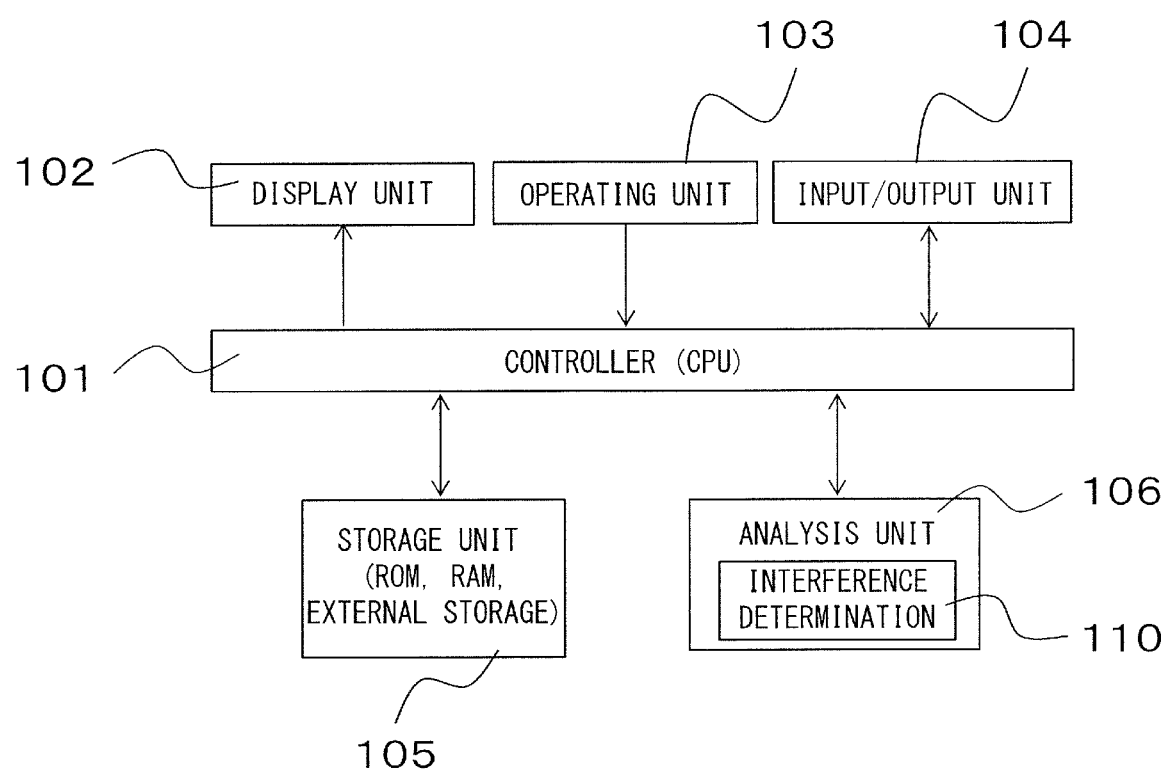
FIG. 2 is a block diagram illustrating a control system of the simulator system of the first embodiment.

FIG. 2 illustrates an exemplary configuration of a control system which is an execution environment of the simulation software E of the present embodiment. While the configuration in FIG. 2 is composed of control circuits of the computer body A described above in terms of hardware, FIG. 2 illustrates also as a configuration of functional blocks. Therefore, the respective functional blocks in FIG. 2 may be considered either as a hardware configuration or a software configuration. The configuration in FIG. 2 is what a display unit 102, an operating unit 103, an input/output unit 104, a storage unit 105 and an analysis unit 106 are connected to a controller 101 serving as a display controller outputting display information to be displayed on the display unit 102 (display apparatus).

A display format of the display unit 102 may be any format as long as the display unit 102 corresponds to the display B in in FIG. 1 for example and enables to display a model display area and an event display area described later. The operating unit 103 constitutes a user interface and corresponds to the mouse C and the keyboard D in FIG. 1 for example. The hardware of the operating unit 103 may include another pointing device such as a track pad. The display unit 102 may be also integrated with the operating unit 103 by using a device such as a touch panel.

Figure 3:
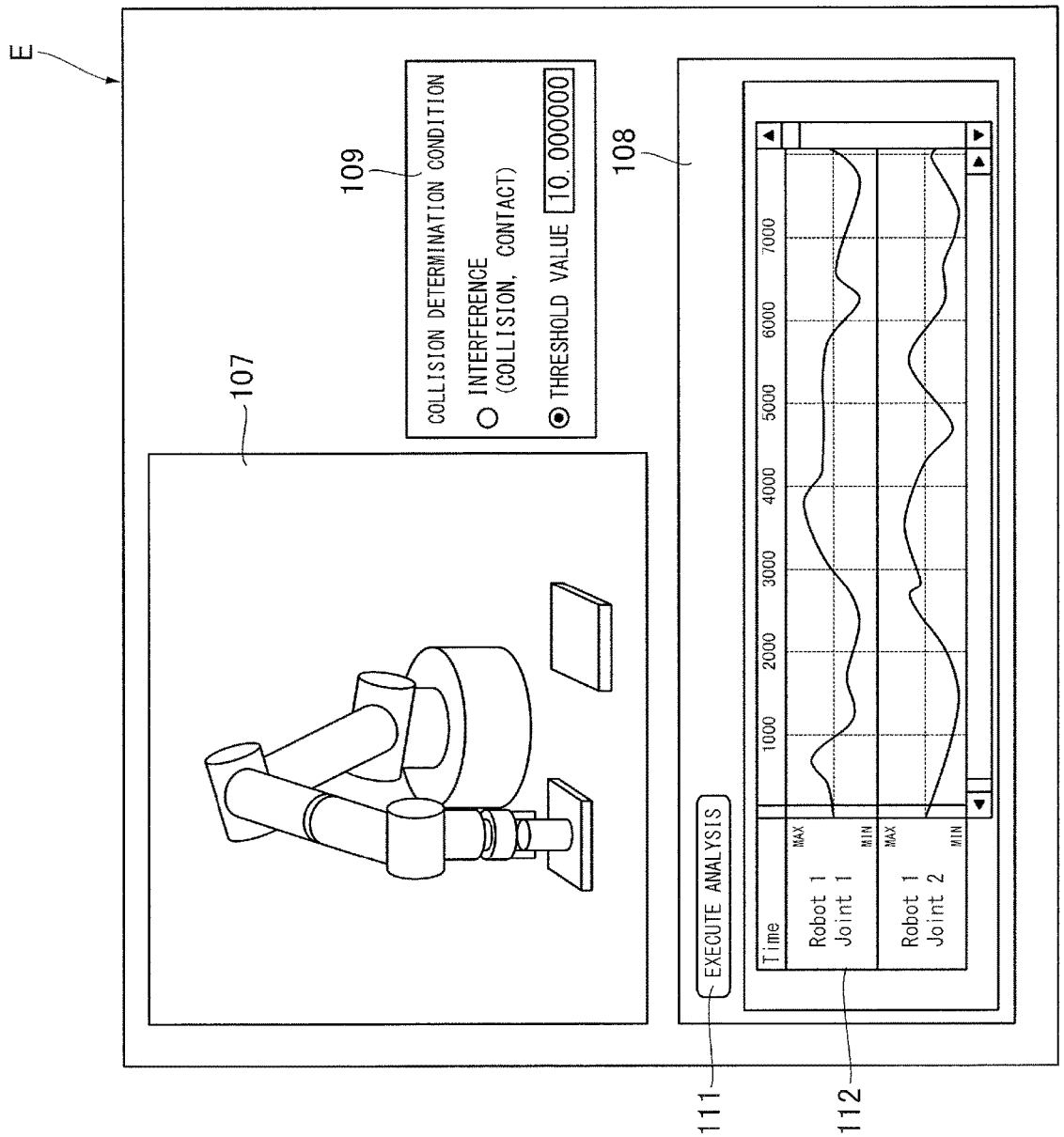
FIG. 3 illustrates an outline of simulation software and display outputs of the first embodiment.

As illustrated in FIG. 3, the display unit 102 draws the screen to display a 3D model display area 107, an event display area 108 and an analysis condition setting area 109. In the present embodiment, the 3D model display area 107 is constituted of an operation display area displaying an operation of a robotic system by simulating the operation of the robotic system within a virtual environment based on robot control data. The event display area 108 is constituted of an information display area displaying information related to operation parameters based on the robot control data in a time-series manner.

The displays of the 3D model display area 107, the event display area 108 and the analysis condition setting area 109 are controlled so as to be linked through the operation of the 3D model of the robotic system within the virtual environment and through an operation of the user made through the display unit 102 and the operating unit 103. For instance, a cursor or a vertical bar is displayed at a position on a time base on the event display area 108 corresponding to a drawn frame being displayed on the 3D model display area 107 to associate these two displays with each other. Still further, in a case where the animation (moving image) display is made on the 3D model display area 107, the display of the event display area 108 is automatically scrolled such that the position on the time base corresponding to the display of the 3D model display area 107 is accommodated within the display area. In the same time, the cursor and the vertical bar described above are automatically moved such they assume the positions on the time bar corresponding to the display of the 3D model display area 107.

It is also desirable to control such that information displayed on the display area of either one of the 3D model display area 107 and the event display area 108 is updated corresponding to an operation, made through the operating unit, of designating or selecting information displayed on the other one of the 3D model display area 107 and the event display area 108.

Preferably, the displays of the 3D model display area 107, the event display area 108 and the analysis condition setting area 109 are displayed by the display unit 102 in such manner that enables the user to visually recognize related parts simultaneously. For instance, in a case where the display unit 102 is composed of one display B, these respective display areas 107 through 109 are displayed in a format of multi-windows and tabs within one display area. In a case where a plurality of displays B composing the display unit 102 exists (a so-called multi-head configuration), the configuration may be made such that the respective display areas 107 through 109 are displayed on display areas of the plurality of different displays, respectively.

For instance, suppose a case where the 3D model display area 107, the event display area 108 and the analysis condition setting area 109 are displayed simultaneously within one display area of the display unit 102. A division mode and an overlap mode on the screen of the display window composing the respective display areas 107 through 109 in that case are configured such that they can be changed in accordance to an operation practice or the like of the GUI (Graphic User Interface) in many operating systems. Still further, in a case where the display B is composed of not only one but of a plurality of monitoring devices, the system may be configured such that arbitral parts of the 3D model display area 107, the event display area 108 and the analysis condition setting area 109 are displayed respectively on the display areas of the different monitoring devices.

The 3D model display area 107 displays the 3D model reproducing the system and enables to change a point of view or disposition of the 3D model.

The event display area 108 includes an execute analysis button 111 and a graph display area 112.

The graph display area 112 of the event display area 108 is displayed along the time base and displays a relationship between a time of an operation and a command value of each axis of the robotic system in a format of a graph as illustrated in FIG. 3. According to the present embodiment, the time base of the graph display area 112 is illustrated while being disposed mainly along a horizontal direction in the graph in the screen display. The graph display area 112 in FIG. 3 is in a condition of graphically displaying changes along the time base of joint positions (joint angles) of two joint axes (Joints 1 and 2) of (the 3D model: Robot 1) of the robotic system.

An elapsed time (second, millisecond or the like) since a reference time such as an operation starting time described in the robot control data such as an epoch of an OS, a robot program and teaching point data may be used as unit of the time base of the graph display area 112. A person skilled in the art may arbitrary adopt the unit of the time base of the graph display area 112 such as a reference time of the GMT (Greenwich Mean Time), the JST (Japan Standard Time) and the like. Note that it is preferable to configure such the time base on the screen of the graph display area 112 can be scaled up or down through an appropriate user interface that enables to select a time width corresponding to one screen of the graph display area 112 for example.

The system is also configured such that the display of the graph display area 112 can be scrolled along the time base, e.g., in the horizontal direction, or in a direction of display items, e.g., in a vertical direction, in a case where there is a large number of display items. So-called scroll bars are provided at a lower edge portion and at a right edge portion of the graph display area 112 in FIG. 3 such that the scroll operation can be made as described above by using the mouse C in FIG. 1. The scroll operation as described above may be also made by a wheel not illustrated and provided in the mouse C.

The analysis condition setting area 109 enables the user to select analysis conditions of the analysis unit 106 described later. The input/output unit 104 enables the user to input/output data necessary for simulation. The storage unit 105 stores data inputted through the input/output unit 104 and results of the analysis unit 106 described later. The storage unit 105 may be configured by ROM, RAM and an external storage unit such as HDD (Hard Disk Drive) and SSD (Solid State Drive). In such a case, a control program describing a control procedure illustrated by a flowchart described later is stored in a ROM area of the storage unit 105 and in the external storage unit such as the HDD and SSD. The storage unit of the control program describing the control procedure of the present disclosure constitutes a computer-readable storage medium of the present disclosure. The storage unit of the control program of the present disclosure may be not only the fixed storage hardware such as the ROM area and the external storage unit such as the HDD and SSD but also a removable storage medium such as a magnetic disk, an optical disk and a semiconductor memory device. The control program of the present disclosure can be conveyed through these storage media, can be installed from the storage media to the simulator system. The installed control program can be updated. Still further, the installation and update of the control program of the present disclosure to the simulator system may be made through a network besides the computer-readable storage medium.

The RAM area of the storage unit 105 is used as a main storage area (or a work area) of the CPU realizing the controller 101 and the analysis unit 106. This main storage area may be consisted of a so-called virtual (area) formed of swap areas disposed in the RAM area and the external storage device such as the HDD and the SSD besides the RAM area.

The analysis unit 106 of the present embodiment analyzes an event of an operation of the 3D model of the robotic system to be verified by the simulator system. More specifically, the analysis unit 106 analyzes operation parameters of the robot and specifies a warning event related to the operation of the 3D model of the robotic system. The analysis unit 106 of the present embodiment judges interference determination, i.e., judges whether interference has occurred between the model of the robotic system operating in the virtual environment and another obstacle model. Then, in a case where the interference (collision or contact) has occurred, the analysis unit 106 specifies such event as the warning event. That is, the analysis unit 106 of the present embodiment includes a function of interference determination 110.

When the user operates an execute analysis button 111 in the analysis condition setting area 109 by using the mouse C, the keyboard D and others, the analysis unit 106 executes a process of the interference determination 110. Here, the analysis unit 106 analyzes simulation data related to conditions of the models such as the robotic system and the other object operating in the virtual environment and detects an interference of the robotic system with the other object as the warning event.

It is noted that the analysis condition setting area 109 and the event display area 108 are illustrated as different display windows (or panes) in FIG. 3, the analysis condition setting area 109 may be considered to be constituting a part of the event display area 108. The display part of the analysis condition setting area 109 may be displayed within the display window (or pane) of the event display area 108.

The link control of the displays of the 3D model display area 107, the event display area 108 and the analysis condition setting area 109 includes the controls of setting the analysis condition and of the execute analysis button 111 as described above in the present embodiment. Still further, if an event meeting with the search (analyze) condition such as the interference (collision or contact) is searched through the operation of the analysis condition setting area 109 and the execute analysis button 111 for example, the display of the graph display area 112 of the event display area 108 is updated accordingly in the present embodiment. For instance, the display of the graph display area 112 is updated such that a position on the time base corresponding to the searched event appears on the graph display area 112. The event concerned is also displayed on the graph display area 112 with a control of a display mode such as changes of a display color as described later.

The display of the graph display area 112 in the event display area 108 can be scrolled along the time base (or in a direction of an array of items) as described above such that the event that draws attention of the user appears within the display. Then, in conjunction with such scroll operation and a click of the mouse C to the target event within the display of the graph display area 112, the operating condition of (the 3D model of) the robotic system displayed on the 3D model display area 107 is updated to a condition corresponding to the target event.

Figure 4:
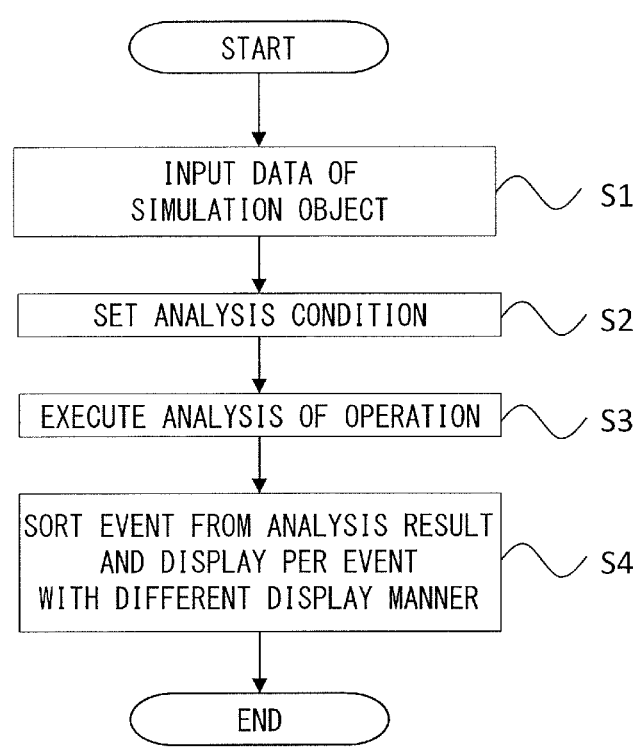
FIG. 4 is a flowchart illustrating a processing procedure of the simulator system of the first embodiment.

The control of setting the analysis condition by the analysis condition setting area 109 and the simulation analysis executed through the operation of the execute analysis button 111 are made in accordance to a control procedure as illustrated in FIG. 4 for example.

At first, data of a simulation object is inputted in Step S1 in FIG. 4. The data of the simulation object includes a 3D model of the robotic system to be verified, arrangement information of the 3D model, a command value of a movable axis of the robotic system and others. The data of the simulation object is described in a configuration file in a format of a robot program, of teaching point data or other specific description formats. The user designates a file name or the like corresponding to the data of the simulation object through the user interface of the display unit 102 and the operating unit 103.

As the designated data of the simulation object is read in Step S1, the 3D model of the robotic system concerned is displayed on the 3D model display area 107 (in a predetermined initial condition for example) as illustrated in FIG. 3. At this time, the graph display area 112 of the event display area 108 displays an event related to the 3D model concerned in response to a time base before and after the event in which the condition of the model displayed on the 3D model display area 107 is included. In the display format of the graph display area 112 in FIG. 3, a value, e.g., a command value, of a position (angle) of a joint axis of the robotic system is displayed along the time base (time) of the operation of the 3D model of the robotic system.

An analysis condition is set in Step S2. In the present embodiment, either Interference (Collision) or Interference (Collision) with Threshold is selected as a warning event to be analyzed (searched) in the analysis condition setting area 109. In the present embodiment, the interference (collision) corresponds to a condition in which the 3D models are physically in contact with each other. The interference (collision) with threshold is what prevents interference (collision) that may occur in an actual machine due to a simulation error caused by processing accuracy or a mechanical error of the actual robot. For instance, a numerical range by which reliability of an operation can be assured before and after the condition in which the 3D models are in contact with each other is designated by the interference (collision) with threshold to confirm that the 3D models do fall into that range. In a case where Interference (Collision) with Threshold is selected as the warning event to be analyzed (searched) in the analysis condition setting area 109, the range in which the reliability of the operation can be assured is set by a threshold value. This threshold value is designated by the user through the analysis condition setting area 109 in a format of a value (in unit of mm or the like) of a clearance (gap distance) in the condition in which the 3D models are in contact with each other.

In Step S3, the analysis unit 106 executes an analysis process on the robot operation described by the robot control data (the robot program or the teaching point data). This analysis is started by clicking the execute analysis button 111 in FIG. 3 for example. Here, the 3D model of the robotic system is operated within the virtual environment to make the interference determination (110) in appropriate unit such as a frame of the moving image display displayed on the 3D model display area 107. For instance, the operation of the 3D model of the robotic system is checked one frame each to make the interference determination (110) on all of the frames. At this time, the interference determination (110) is made under the condition set in Step S2.

The interference determination (110) of the analysis unit 106 is outputted as a determination (analysis) result of data discriminating the three types of events of the interference (collision), the interference (collision) with threshold and no interference (collision). The determination (analysis) result of the interference determination (110) is expressed by an error code (numerical value) such as a result code set in advance. The analysis result of the interference determination (110) of the analysis unit 106 is stored in the storage unit 105 together with the frame of the operation.

In Step S4, the events related to the operation of the 3D model of the robotic system, obtained from the analysis result in Step S3, are sorted and are displayed on the 3D model display area 107 (the display B) with different display patterns (display manners) per each condition (content). The analysis result is displayed on the graph display area 112 of the event display area 108 in the present embodiment.

Here, in sorting the events, the analysis unit 106 analyzes the analysis result so as to specify the three events of the interference (collision), the interference (collision) with threshold and no interference (collision) as described above. That is, the analysis unit 106 sorts the events related to the operation of the 3D model of the robotic system to these three events. It is noted that in a case where the specific analysis result, e.g., one frame, includes both of the interference (collision) and the interference (collision) with threshold, the analysis unit 106 prioritizes a display of the more problematic interference (collision) and sorts as the interference (collision) event.

As for the display of the event designated as the warning event to be analyzed (searched) in the analysis condition setting area 109 among the sorted events, it is displayed by a different display pattern (display manner) to highlight from the other events, e.g., the event of no interference (collision). For instance, in a case where the events of the interference (collision) and/or the interference (collision) with threshold are designated as the warning events to be specified (searched), the display manners are controlled as illustrated in the graph display area 112 in FIGS. 5A and 5B.

Figure 5A:
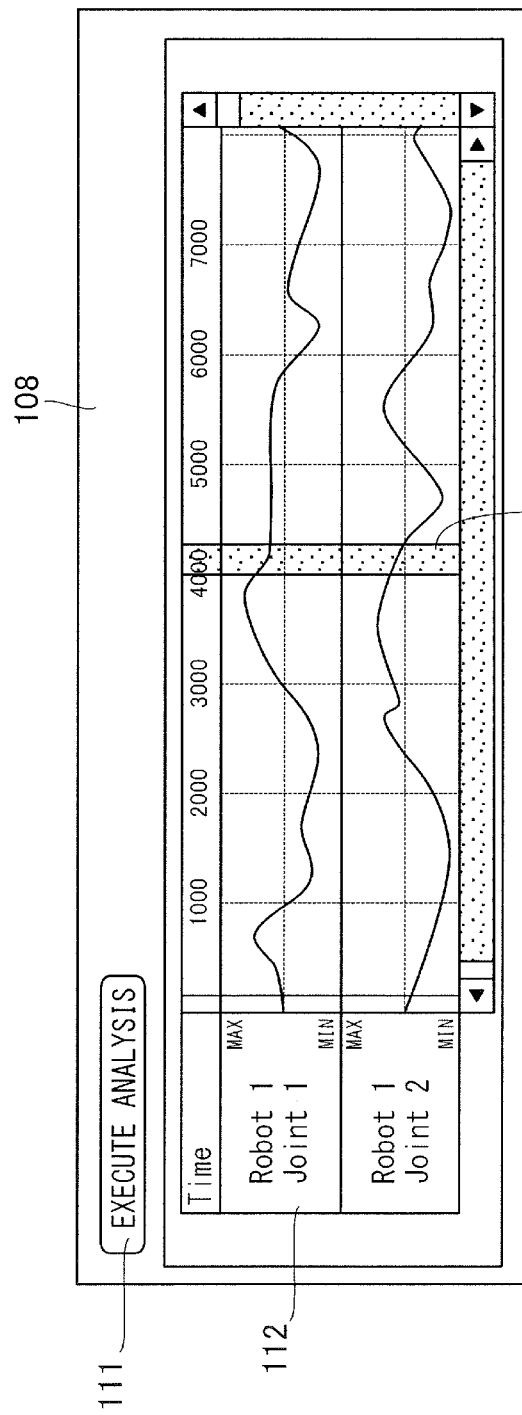
FIG. 5A is a chart illustrating an event display area indicating an alarm event specified as interference (collision).
Figure 5B:
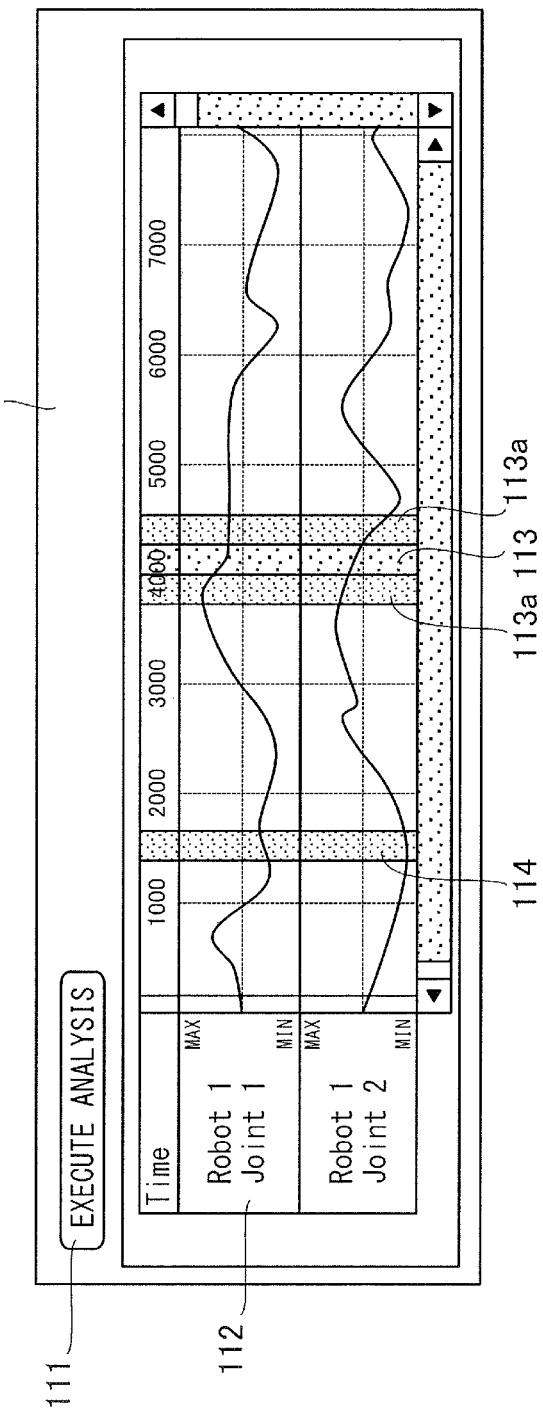
FIG. 5B is a chart illustrating the event display area indicating an alarm event specified as interference (collision) with thresholds.

In a case of the warning event specified as the interference (collision) for example, a frame concerned in the graph display area 112 is displayed while being superimposed with a color, e.g., a red band (113), different from other parts as illustrated in FIG. 5A. A frame corresponds to the warning event specified as the interference (collision) with threshold is displayed while being superimposed with a yellow band (114) for example different from the other part as illustrated in FIG. 5B. Note that in the case of the warning event of "Interference (Collision)", the robotic system operates along a certain trajectory in general and hence, the warning event corresponding to "Interference (Collision) with Threshold" appears before and after the warning event. Therefore, yellow bands (113a and 113a) are displayed on both sides before and after the red band (113) in FIG. 5B. A default display color (or display brightness and density) of the graph display area 112 is adopted for other events having no interference (collision). It is noted that while the control of changing the display manner of changing the display color of the graph display area 112 is exemplified here, the display manner may be changed through the change of the display brightness and density.

As described above, according to the present embodiment, the display manner different from the display of the other events is adopted in displaying the event corresponding to the warning event depending on the analysis (search) result of the analysis unit 106 on the graph display area 112 of the event display area 108. This arrangement makes it possible for the user to readily perceive the presence of the warning event related to the interference (collision) of the 3D model of the robotic system in one screen of the graph display area 112 of the event display area 108. That is, the user can intuitively judge the presence of the warning event of the interference (collision) or the like and can considerably cut a man-hour required for the verification process using the simulator system.

The user who has visually recognized the warning event on the graph display area 112 of the event display area 108 changes the robot control data (the teaching point data and the robot program) of the 3D model of the robotic system such that the warning event disappear.

In the case where the condition of the interference (collision) or the interference (collision) with threshold is present, the user makes an operation of selecting (the color band indicating) the frame of the event causing the interference (collision) for example by the mouse C. Corresponding to this operation, the simulation software E calculates a position and orientation in the virtual environment of the 3D model of the robotic system at the point of time of the event and displays them on the 3D model display area 107. Thereby, the user can readily confirm the virtual environment of the 3D model of the robotic system at the point of time when the event of the interference (collision) or the interference (collision) with threshold has occurred by the 3D display of the 3D model display area 107. The 3D display on the 3D model display area 107 at this time may be a still image display at the timing of the event concerned or may be a motion image display corresponding to an appropriate time width before and after the event concerned.

In the display of the 3D model on the 3D model display area 107 related to the warning event, the display manner of a part or the (entire) 3D model of the specific robotic system causing the interference (collision) is changed to what is different from other models. For instance, in a case of changing the display color as the change of the display manner, a same display color with the display color of the band indicating (highlighting) the warning event concerned on the event display area 108 is used. Then, the user can visually recognize the specific 3D model or the specific part related to the warning event concerned very easily by thus changing the display mode in displaying the 3D model on the 3D model display area 107.

Note that there may be a case where the band (113, 114 or the like) indicating the warning event concerned is thin and cannot be selected depending on a display scale of the time base on the graph display area 112. In such a case, it is possible to widen a width of the band (113, 114 or the like) indicating the warning event concerned by changing the display scale of the time base of the graph display area 112. Then, a display area per one frame of the graph display area 112 increases, enabling the use to readily select the band.

It is also possible to confirm a corrected part of the robot control data for eliminating the warning event from a condition of the 3D model on the 3D model display area 107. For instance, in order to avoid the condition of the interference (collision) of the robot specified as the warning event, a teaching point that becomes an avoiding point is prepared and a program that passes through the teaching point is prepared.

In such a case, an operation is made on the position and the orientation of (the 3D model) of the robotic system through the use of the 3D model display area 107 to prepare the teaching point that becomes the avoidance point. The user interface for operating on the position and the orientation of the 3D model through the use of the pointing device such as the mouse C and the 3D model display area 107 is known, and such known user interface may be used for the preparation of the teaching point that becomes the avoidance point. In a case where the process of the interference determination 110 is made and the interference (collision) occurs while operating (the 3D model) of the robotic system on the 3D model display area 107, the display manner is changed in the same manner as described above to alarm the user of the warning event.

As the user designates the teaching point as the avoidance point, an instruction for moving the robotic system to the teaching point is additionally recorded in the robot control data, e.g., in the robot program and the teaching point data. A user interface for making such additional recording is also known in the simulator system and can be utilized in additional recording of the teaching point to the robot program and the teaching point data. The additionally recorded program and the teaching point data can be converted into data of command values for individually operating the joint and the like of the robotic system by an inverse kinematic arithmetic operation of the robot controller built in the simulator system or of an external robot controller. After that, it is possible to verify the presence of the warning event such as the interference (collision) by inputting the changed (additionally recorded) robot program and the teaching point data into the simulation software E and by executing the processes of Steps S1 through S4 described above again. The user can verify the robot control data and can edit it into a condition in which no warning event such as interference (collision) occurs by repeating the correction operations as described above.

As described above, according to the present embodiment, the simulator system is provided with the event display area 108 that displays events related with the operation of the model of the robotic system in the virtual environment on the time base in linkage with the display of the 3D model display area 107 that displays the model of the robotic system that operates in the virtual environment. That is, the warning event specified by the analysis unit 106 is displayed on the 3D model display area 107 serving as the operation display area and on the event display area 108 serving as information display area in association with each other. Accordingly, the present embodiment can provide a user interface that enables the user to readily and intuitively judge the presence of the warning event such as the interference (collision) related to the operation of the robotic system being verified. According to the user interface of the present embodiment, the user can intuitively judge the presence of the warning event related to the operation of the robotic system being verified and can conduct the verification works or the editing works of the robot control data reliably and very efficiently without omission of confirmation.

Second Embodiment

The configuration in which the graph display area 112 is provided as the display area accompanied with the time base in the event display area 108 has been exemplified in the first embodiment. However, the display format of the event display area 108 in which an event is indicated on the time base is not limited to that of the graph display area 112 displaying a linear or wavy line on the time base, i.e., to that of the graph display area 112 having a format of a so-called "diagram". The event display area may be any display as long as it can display a series of robot operations having a certain time length chronologically as events. For instance, various configurations described below are conceivable.

FIGS. 6A through 6D illustrate various exemplary display forms of event display areas (201, 202, 203 and so on) of a second embodiment. The other hardware/software configurations are the same with those of the first embodiment. Members of the second embodiment having identical or same functions with those members of the first embodiment will be denoted by the same reference numerals and detailed description thereof may be omitted.

FIGS. 6A and 6B illustrate configurations of event display areas 201A and 201B of so-called slider displays of linear and circular (ringed) lines, respectively. In FIGS. 6A and 6B, the event display areas 201A and 201B display a red band (113) and yellow bands (113a and 114) respectively indicating positions of the respective warning events of an interference and an interference (collision) with threshold on the linear and ringed slider bars. Numerical displays (0 through xxxx) of times of starting and ending points of a time base are displayed at both ends of each slider bar. Still further, as illustrated in FIGS. 6A and 6B, the event display areas 201A and 201B are provided with a slider handle 201a for selecting a specific time or an event at that time on the slider bar.

In a case where an event of the specific time on the slider bar is selected by the slider handle 201a, a window or a tab of a detail display area displaying information related to that event is separately popped up and displayed. This system makes it possible for the user to read detailed information of the specified event such as a joint position (angle) of each joint for example. Displayed contents of the popped up window or the tab at this time may be numerical information such as the joint position (angle) of each joint and an instruction texts of the robot program as illustrated on a first lines of the event display areas 202 and 203.

The event display areas 201A and 201B as illustrated in FIGS. 6A and 6B are compact as compared to the graph display area 112 of the first embodiment and are suitable in displaying the display areas in a limited space. For instance, the display formats of FIGS. 6A and 6B are suitable in a case where a display surface of the graph display area 112 (the display B) is limited and is composed of a display area including less numbers of pixels lengthwise and breadthwise like a mobile terminal and a teaching pendant.

FIG. 6C illustrates an example of an event display area 202 having a display manner of a table format. The event display area 202 in FIG. 6C takes a time base in a vertical direction of the table (in an array direction of lines) and displays six joint positions (angles) of a robotic system (Robot 1) by using each column. It is also possible to display the red band (113) and the yellow bands (113a and 114) respectively indicating the positions of the respective warning events of the interference and the interference (collision) with threshold also in the event display area 202 of the table format. The relatively detailed event display area 202 of such table format is suitable in a case of verifying a relationship between a command value and an analysis result of an operation. For instance, this table format display area is suitable in a case of preparing a teaching point for avoiding an interference (collision) condition of the robot. That is, it is possible to confirm how much the robot can be moved from a command value of each axis and a limit of each axis in a frame of the interference (collision) condition displayed on the event display area 202 of the table format. This table format display is useful as a standard in preparing the teaching point.

What is also conceivable as a display manner having a time base of the event display area is a list display in which descriptions of robot operations are arrayed in a chronological sequence. What is conceivable as such list display is a list display of source codes describing a robot program for example. For instance, an event display area 203 in FIG. 6D is consisted as a list display of source codes of a robot program, e.g., as a display of a program editor. The event display area 203 in FIG. 6D displays a robot program of 10 lines in which instructions describing robot operations to be executed are arrayed in a chronological sequence.

It is also possible to display the red band (113) and the yellow bands (113a and 114) respectively indicating positions of the respective warning events of the interference and the interference (collision) with threshold also in the event display area 203 in FIG. 6D. In this example, the display manner is controlled through the change of the display color such that warning events are highlighted to instruction texts concerned causing the respective warning events of the interference and the interference (collision) with threshold. Note that although the control of the display manner of changing the display colors of the respective warning events of the interference and the interference (collision) with threshold are made in the examples in FIGS. 6A through 6D, a control of other display manners such as brightness and density may be also made.

The event display area 203 in the robot program editor format as illustrated in FIG. 6D is suitable in a case of judging by which instructions on the robot program the warning events of the interference and the interference (collision) with threshold are generated. Noted that in the robot program in general, such an instruction text in a format of moving (Move) TCP (Transmission Control Protocol) to a certain position is used. Therefore, there is a case where one instruction text includes a plurality of frames of robot operations and one instruction text is involved in both warning events of the interference (collision) and the interference (collision) with threshold. In such a case, the change of the display manner is made by adopting the display manner of the interference (collision) which is more problematic.

The configuration using the graph display area 112 of the first embodiment and the event display areas 201 thorough 203 illustrated in FIGS. 6A through 6D described above have peculiar effects as the event display area even by themselves, they may be also effective when utilized in combination of the plurality of screens. That is, it is possible to pop up the event display areas 202 and 203 of the detailed displays illustrated in FIGS. 6C and 6D from an interface of the event display areas 201A and 201B of the slider displays illustrated in FIGS. 6A and 6B. Still further, if the display area of the display B has a space, those event display areas may be displayed such that the user can visually recognize them simultaneously.

Still further, in order to use the graph display area 112 of the first embodiment in combination with the event display area 203 in the program editor format in FIG. 6D, the following display control can be made for example. In this case, suppose that the event display area 203 in the program editor format in FIG. 6D permits to edit (change) the codes of the program displayed by the editing process of the user made through the user interface of the display unit 102 and the operating unit 103. Still further, suppose that a file of source codes of the editing result can be stored in the storage media such as the external storage unit (HDD and SSD).

For example, there is a case where such a warning event of the interference (collision) or the interference (collision) with threshold is generated during when the 3D model of the robotic system moves between two teaching points in the process of the simulation. In such a case, the user corrects the program by adding a teaching point for example so as to be able to avoid the interference (collision) condition. In such a case, it is useful for the user to be able to display and to use the 3D model display area 107 of the first embodiment together with the graph display area 112 of the first embodiment and the event display area 203 in the program editor format in FIG. 6D as the event display areas.

In such a case, the user confirms the graph display area 112 at first, designates a color band (113, 113a or 114) of a frame corresponding to a warning event of the interference (collision) or the interference (collision) with threshold by using the mouse C or the like and then moves to that frame. After making the operation of moving to the frame corresponding to the warning event, the user updates the display of the 3D model display area 107 displaying such that the warning event can be simultaneously and visually recognized to that frame to display the robotic system at a position and an orientation in the condition of the warning event concerned.

At this time, it is preferable to arrange such that the display of the 3D model display area 107 can be changed such that the user can readily and visually recognize the warning event by moving a viewpoint of the 3D model display area 107 or by GUI that turns the 3D model for example. Still further, in a case of using the 3D model display area 107, there is known a configuration of making a direct teaching operation of operating the 3D model being displayed by using the mouse C or the like. Such direct teaching operation can be used in adding the teaching point to avoid the warning event as described above.

For instance, the user makes the direct teaching operation by using the mouse C or the like from the condition of the warning event of the interference (collision) or the interference (collision) with threshold being displayed on the 3D model display area 107 to change the position and the orientation of the 3D model of the robotic system and to designate a teaching point that enables to avoid the warning event concerned. After preparing the avoidance teaching point, the user selects the frame of the warning event of the interference (collision) or the interference (collision) with threshold concerned again on the graph display area 112. It is noted that if the event display area 203 in the program editor format is still being displayed at this time, a code of the part concerned is displayed on the event display area 203 in the program editor format corresponding to this selecting operation.

The display of the event display area 203 in the program editor format is updated so as to be linked with the condition of the display of the 3D model display area 107 or with the event selection on the time base of the graph display area 112. For instance, if the frame concerned of the warning event of the interference (collision) or the interference (collision) with threshold is selected again on the graph display area 112, an operation code of the frame concerned is highlighted by the highlight display. An operation code of moving to an avoidance teaching point added and prepared by using the 3D model display area 107 is automatically and additionally recorded right before for example of the operation code corresponding to the frame of the warning event. Or, only an insert position may be automatically generated as the operation code designating the move to the teaching point or the user may input manually. Or, the operation code moving to the avoidance teaching point is automatically generated and is automatically inserted into the position concerned or the addition of the operation code is defined after user's operation of permitting such insertion.

As the corrected robot program is executed after adding the move instruction to the avoidance teaching point, command value data of the robotic system is prepared. It is then possible to confirm the operation of the robotic system after the correction by inputting the prepared command value data to the simulation software E again and by executing the processes of Steps S1 through S4 of the first embodiment.

As described above, it is possible to link the display of the 3D model display area 107 with the display of one or plural event display areas 203 to update their displays corresponding to the event selection or the editing process of the user. This arrangement makes it possible to readily correct the robot control data (the teaching point and the robot program), to cut a man-hour required for the simulation of the robotic system and to efficiently perform the simulation process. Note that it is conceivable to prepare the robot control data (the teaching point and the robot program) to be verified by the simulator system by a virtual controller within the simulator, e.g., by direct teaching by using the 3D model display area 107. Not only that, what prepared by using a control terminal of another external device such as a teaching pendant may be also used as the robot control data (the teaching point and the robot program) to be verified by the simulator system.

Third Embodiment

A display control of a simulator system of a third embodiment of the present disclosure will be described below with reference to FIGS. 7A through 7C.

The exemplary control of the display manner of indicating the positions of the warning events of the interference and the interference (collision) with threshold respectively by the red band (113) and the yellow bands (113a and 114) has been illustrated with respect to the graph display area 112 of the event display area 108 of the first embodiment.

A method other than changing the display color may be used as a control method for changing a display manner of highlighting each warning event of the interference and the interference (collision) with threshold on the event display area 108 having the time base.

For instance, as illustrated in an event display area 201C in FIG. 7A, display patterns such as a stripe band (301) and mesh band (302) may be used to highlight the respective warning events of the interference and the interference (collision) with threshold. Such hatching display manner is suitable in a case where the display B is a monochrome display having no color display function.

It is noted that while the display formats of event display areas 201C and 201D illustrated in FIGS. 7A and 7B illustrate other examples of the event display area 201A displaying the slider bar in FIG. 6A, these event display areas may be provided with the graph display area 112 as a display area accompanied with the time base in the event display area 108 similar to the display manner in FIG. 5.

The event display area 201D in FIG. 7B displays marks such as an arrow (303) and a triangle (304) at positions of events concerned on the slider bar to highlight the respective warning events of the interference and the interference (collision) with threshold. The highlight display by such marks is suitable in a case where a display surface of the event display area 201D displaying the slider bar or a display surface per one frame of the robot operation of the graph display area 112 is small. Still further, it is possible to improve the easiness of the visible recognition of the display by marking only frames in which analysis results have been changed because possibility of overlapping the marks with each other is lowered.

An event display area 202 illustrated in FIG. 7C has a table type display format similarly to that in FIG. 6B. The event display area 202 in FIG. 7C changes sizes of characters (305) and thickness of characters (306: Boldface) to highlight the respective warning events of the interference and the interference (collision) with threshold. Other adoptable changes of the display manner of characters include changes of colors and fonts of the characters. Depending on the display B, readability of the characters drops by the superimposed display of the hatching display pattern and the characters. In such a display, there is a case where it is useful to highlight the respective warning events of the interference and the interference (collision) with threshold by changing the display manner of the characters themselves as illustrated in FIG. 7C.

Accordingly, the display manner as illustrated in FIGS. 7A through 7C also makes it possible for the user to intuitively recognize the warning event and to conduct the simulation works efficiently by highlighting the warning event such as the interference (collision) with threshold. That is, according to the user interface of the present embodiment, the user can intuitively judge the presence of the warning event related to the operation of the robotic system being verified and can conduct the verification works or the editing works of the robot control data reliably and very efficiently without omission of confirmation.

It is noted that in the case of changing the display manner by the hatching display pattern, the mark display and the characters as illustrated in FIGS. 7A through 7C, the change of the display color (or brightness, density or the like) as exemplified in the first and second embodiments may be made in the same time. For instance, the warning event can be displayed more recognizably by changing the display manner of the color (brightness and density) together with the display manner other than the colors in the same time like a red stripe band (301) and a yellow triangle (304).

Fourth Embodiment

A configuration of a control system of a simulator system and its display control of a fourth embodiment of the present disclosure will be described below with reference to FIGS. 8 through 10.

The configuration of the control system and its display control have been described in the first through third embodiments described above by mainly exemplifying the interference (collision) as the warning event. However, the event to be displayed on the event display area as the warning event may be what is related with another analysis result. In a fourth embodiment, a configuration in which the analysis unit 106 has analysis functions of a singular point determination (401) and a tip acceleration determination (402) in addition to the interference determination (110) will be exemplified. The configuration in terms of hardware and software of the present embodiment is basically the same with those described in the first through third embodiments, and members different from those will be described below. The same or equivalent members with the members already described will be denoted by the same reference numerals, and their detailed description will be omitted here.

Figure 8:
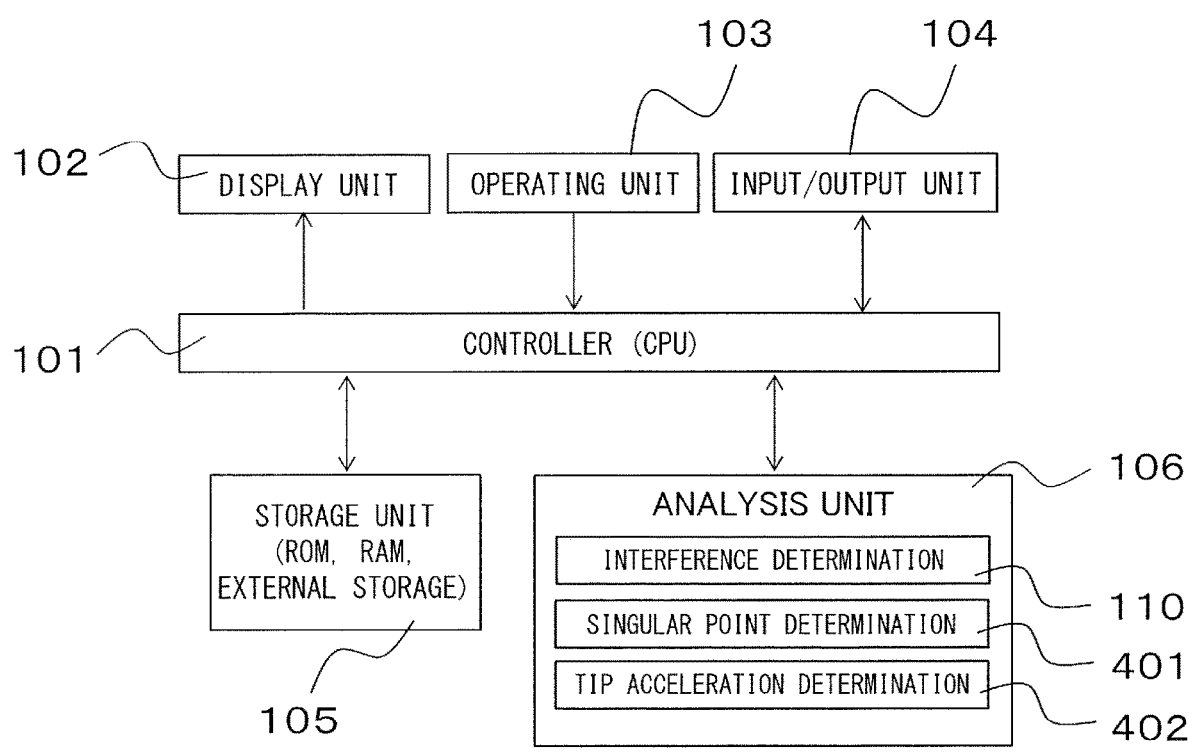
FIG. 8 is a block diagram illustrating a control system of a simulator system of a fourth embodiment.

FIG. 8 illustrates a functional block configuration of hardware and software of a control system of the present embodiment in the same format with that of the first embodiment illustrated in FIG. 2. What is different in FIG. 8 from the configuration illustrated in FIG. 2 is that the analysis unit 106 has functions of the singular point determination 401 and the tip acceleration determination 402 in addition to the interference determination 110. The function of the interference determination 110 is the function of specifying the respective warning events of the interference (collision) and the interference (collision) with threshold similar to those in the abovementioned embodiments.

The singular point determination 401 is a process of calculating and determining an area where solutions of a position and an orientation of the robotic system are not settled. For instance, in a case where a teaching point specifying a position of the TCP is given as robot control data, there exists a position of the teaching point where no solution of the position and the orientation of the robotic system can be obtained in an operation space of the robotic system even if an inverse kinematic calculation is made. An area which becomes a singular point is different depending hardware conditions such as a movable angular range of a joint and a link length in the actual robotic system or a 3D model simulating the robotic system. The singular point determination 401 is made to limit this area of the singular points. That is, the singular point determination 401 is used to prevent a possibility of abnormal stoppage that may occur when the robotic system ends up moving to a singular point where no solution of the position and the orientation of the robotic system can be obtained due to correction of the position or the like of the robotic system.

The tip acceleration determination 402 is a process of calculating an acceleration of a tip, e.g., the TCP, of the robotic system and of determining whether the acceleration is greater than a threshold value. If the tip, e.g., the TCP, of the robotic system is operated with excessive acceleration, there is a possibility that the robotic system drops a work being held or become faulty as an overload is applied to a joint mechanism thereof. The tip acceleration determination 402 is used to control such that the robotic system is not operated under such excessive acceleration.

A display manner in a case where the analysis unit 106 has the functions of the singular point determination 401 and the tip acceleration determination 402 in addition to the interference determination 110 and where warning events specified by these determination units are displayed on the event display area will be exemplified below. It is noted that in the present embodiment, a six-axial articulated robot will be used as the robotic system (or a 3D model thereof) to be simulated.

The procedure of the analysis of the interference determination 110 and the control accompanying with the change of the display mode of the specified warning event of the first embodiment have been illustrated in FIG. 4. The control procedure in FIG. 4 can be used for analysis of the singular point determination 401 and the tip acceleration determination 402 and for a control accompanying with the change of the display mode of the warning events specified by these determinations.

However, in Step S4 in FIG. 4, a display manner distinguishable from other events is used in a display control accompanying with the change of the display manner of the warning events specified by the singular point determination

401 and the tip acceleration determination 402 similarly to the case of the warning event specified by the interference determination 110 for example.

For instance, a singular point (of the 3D model) of the robotic system analyzed by the singular point determination 401 includes a condition in which two axes of a specific joints are located on one straight line. Still further, the six-axial articulated robot has three types of joints of Wright, Elbow and Shoulder, and there exist a singular point Wrist, a singular point Elbow and a singular point Shoulder as conditions of singular points generated for these three types of joints.

Here, the singular point Wrist is a condition in which the fourth and sixth axes are located on one straight line and solutions of the position and the orientation are unsettled. The singular point Elbow is a condition in which the second, third and fifth axes are located on one straight line and solutions of the position and the orientation are unsettled. The singular point Shoulder is a condition in which the first and sixth axes are located on one straight line and solutions of the position and the orientation are unsettled.

Figure 9A:
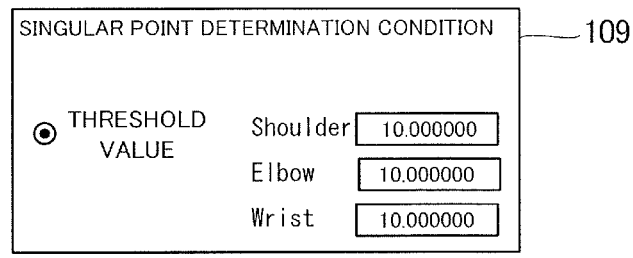
FIG. 9A is a diagram illustrating an analysis condition setting area.

According to the present embodiment, an analysis condition setting area 109 is configured such that the user can set threshold values of the three types of singular points to be analyzed, i.e., the singular point Wrist, the singular point Elbow and singular point Shoulder, as illustrated in FIG. 9A. The singular point Wrist is set by an angle (unit in deg.), and the singular point Elbow and the singular point Shoulder are set by distance from the singular point (unit in mm).

An analysis result of the singular point determination 401 is displayed per each robot. It is because it becomes difficult to discriminate which robot has generated a singular point if there are two or more robots and if analysis results of singular points of all robots are displayed in an overlapped manner.

Figure 9B:
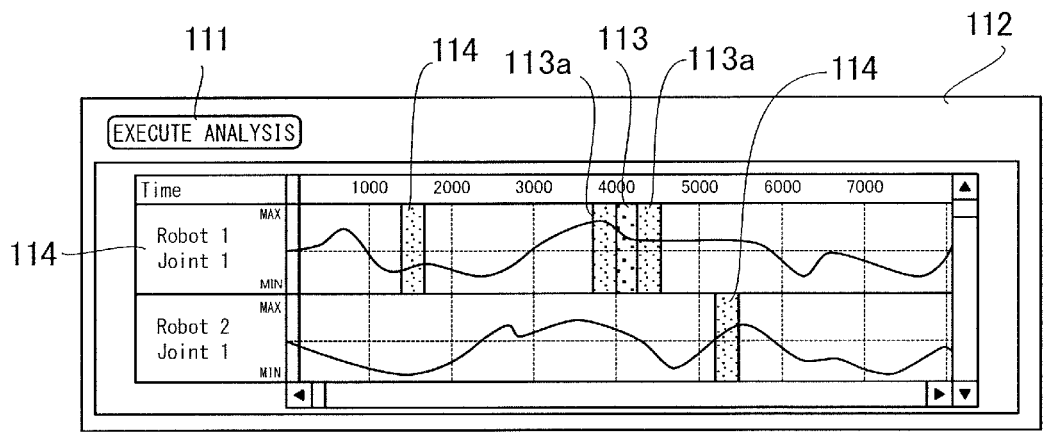
FIG. 9B illustrates an exemplary configuration of a singular point display.

For instance, FIG. 9B illustrates an example in which an analysis result of the singular point determination 401 is displayed on the graph display area 112 of the event display area 108 in the present embodiment. Here, as for the analysis results of the singular point determination 401, a singular point event and a singular point event with thresholds (specified by the analysis condition setting area 109) are indicated by different color bands (113, 113a and 114) similarly to the case of the display manner of the warning event related with the interference described above.

In the display manner of FIG. 9B, angles of first joints (Joint 1) of two robotic systems of Robot 1 and Robot 2 are displayed separately in two stages of upper and lower graph displays. It becomes possible for the user to judge intuitively which robot has generated a singular point by separating the display of the graph display area 112 per each Robot 1 and Robot 2 and by displaying (command values) of the joint angles in the graph.

Figure 9C:
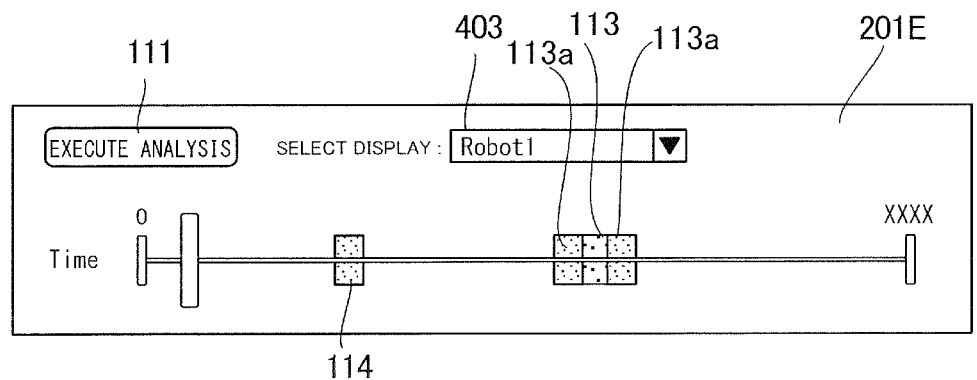
FIG. 9C illustrates an exemplary configuration of a singular point display different from that illustrated in FIG. 9B.

FIG. 9C illustrates an example of changing display manners so as to be able to discriminate the singular point event and the singular point event with threshold specified by the analysis condition setting area 109 from other events on the event display area 201E similar to that in FIG. 6A. The event display area 201E of the slider bar type as illustrated in FIG. 9C can only display events of one robot. In such a case, it is preferable to provide a display selection area (403) composed of a pull-down menu or the like in the event display area 201E to be able to select an analysis result of a robot to be displayed. The singular point event specified as the warning event and the singular point event with threshold (specified by the analysis condition setting area 109) are displayed by different color bands (113, 113a and 114) also in the example in FIG. 9C.

Figure 10A:
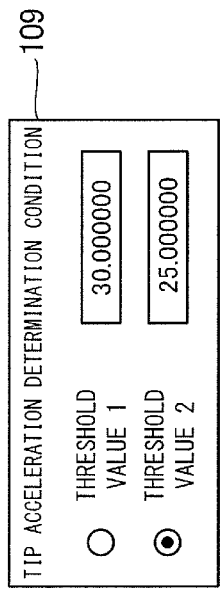
FIG. 10A is a diagram illustrating an analysis condition setting area.

A control of changing a display manner of a warning event specified (analyzed) by the tip acceleration determination 402 will be described with reference to FIGS. 10A and 10B. In a case where acceleration of a specific reference part (such as TCP) exceeds a certain threshold value, the tip acceleration is specified as a warning event by the tip acceleration determination 402. In this case, it is preferable to configure the analysis condition setting area 109 such that the user can set a plurality of threshold values (1 and 2) corresponding to a condition or the like to be verified as illustrated in FIG. 10A.

Figure 10B:
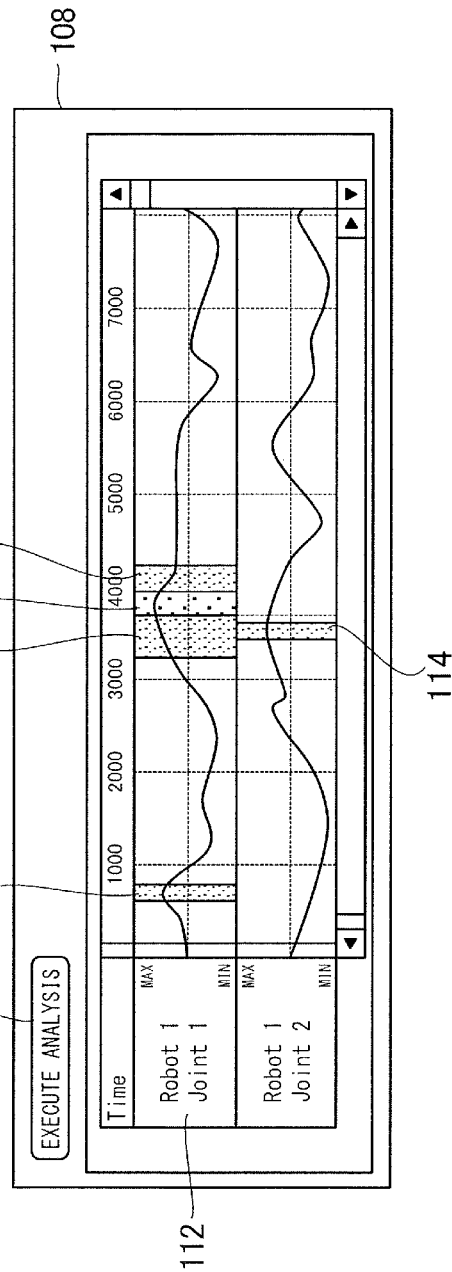
FIG. 10B illustrates an exemplary configuration of a tip acceleration display.

In displaying the warning event specified by the tip acceleration determination 402 on the graph display area 112 of the event display area 108, it is preferable to display separately per each robot as illustrated in FIG. 10B similarly to the case of the singular point. In the example illustrated in FIG. 10B, frames in which the tip acceleration (of the 3D model) of the robotic system exceeds the two threshold values set by the analysis condition setting area 109 are specified as warning events. Then, the excesses of those two threshold values are displayed respectively by different color bands (113, 113a and 114). It is noted that a numerical value to be used for the display may not be a command value of the joint angle but may be a calculation result of the tip acceleration in the graph display area 112 (or in the table format event display areas 202 in FIGS. 6B and 7C).

The warning events obtained through analyses of the singular point and the tip acceleration by the singular point determination 401 and the tip acceleration determination 402 as described above are displayed by the display manners different from other events similarly to the case of the interference determination 110 of the first through third embodiment. Accordingly, the user can intuitively recognize these warning events and can conduct the simulation works efficiently by highlighting these warning events. That is, according to the user interface of the present embodiment, the user can intuitively judge the presence of the warning event related to the operation of the robotic system being verified and can conduct the verification works or the editing works of the robot control data reliably and very efficiently without omission of confirmation.

Fifth Embodiment

A display control of a simulator system of a fifth embodiment of the present disclosure will be described below with reference to FIGS. 11 and 12. It is noted that while a control procedure of a controller 101 will be illustrated by flowcharts in FIGS. 11 and 12, other hardware and/or software configurations of the simulator system are supposed to be the same with those described above in the respective embodiments.

The fifth embodiment illustrates a method of moving to a frame of an event in which a condition of an analysis result changes before and after the event in the event display areas (108 and 201 through 203 in the respective embodiments described above) and the 3D model display area 107 which are linked from each other.

For instance, it is convenient if it is possible to search a position in which a condition changes from a non-warning event (a normal event, not being a warning event) to a warning event or from a warning event to a non-warning event before and after the event on the display of the 3D model display area 107 and to move to its display state.

There are also warning events of different type or different state like the case of the interference and the interference (collision) with threshold as described above. Such transition among these different warning events is also an object of search in the present embodiment.

In general however, the non-warning event occupies a large display area in the display surface of the event display area (108, 201 through 203). Accordingly, the present embodiment is used mainly for searching a warning event from the non-warning event and for moving to that position. Then, a case of searching a position in which a condition changes from the non-warning event to the warning event will be exemplified and described below. However, the procedure illustrated in FIGS. 11 and 12 may be used also in searching a position in which a condition changes from the warning event to the non-warning event.

Figure 11:
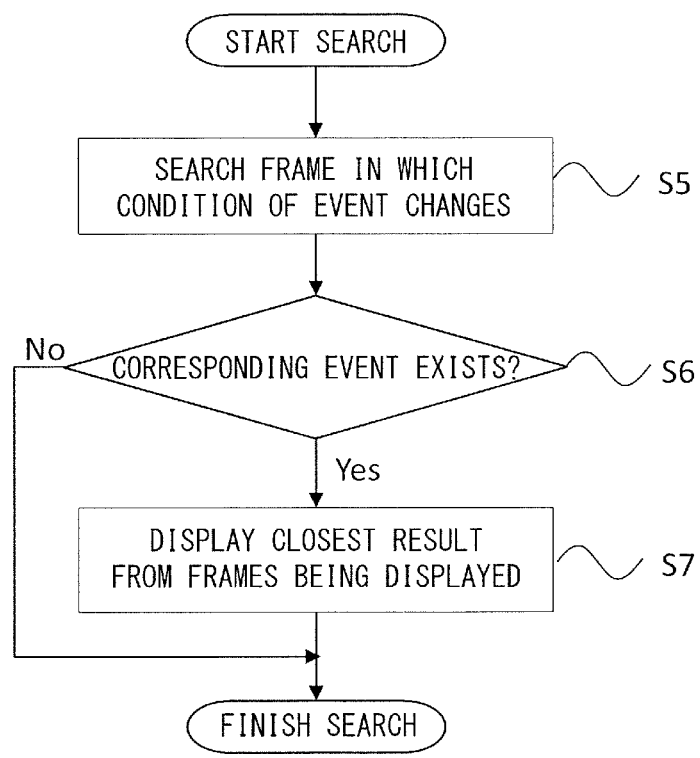
FIG. 11 is a flowchart illustrating a search control procedure of a fifth embodiment.
Figure 12:
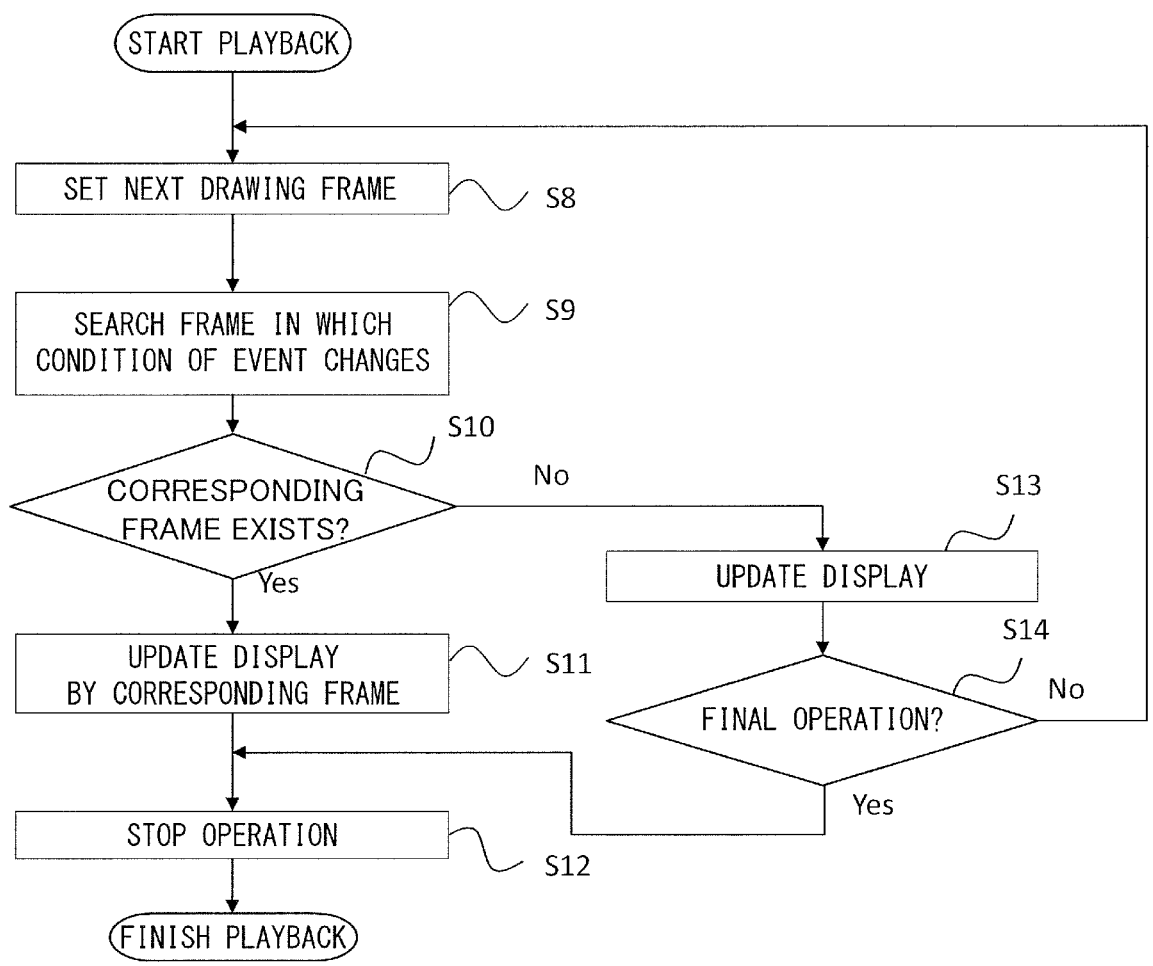
FIG. 12 is a flowchart illustrating a playback control procedure of an animation of the fifth embodiment.

The flowcharts in FIGS. 11 and 12 illustrate respectively different display control procedures of the event display area (108, 201 through 203) of the simulator system of the fifth embodiment.

It is noted that the following description will be made by using the respective warning events of the interference and the interference (collision) with threshold as examples of the warning event. However, the control procedures illustrated in FIGS. 11 and 12 can be utilized in a case of searching the other warning events described in the third and fourth embodiments.

The display control procedure illustrated in FIG. 11 is what moves from an event frame being displayed (or being selected) to the closest frame of an event in which the condition of the analysis result changes through one operation of the user. Here, suppose that the changes of the conditions of the event to be searched are a change from an un-interferent (un-collision) event to interference (collision) with threshold and from an interference (collision) with threshold to interference (collision). Still further, a change from the interference (collision) event to the interference (collision) with threshold and a change from the interference (collision) with threshold to the un-interfering (un-collision) event are also handled as objects to be searched in the present embodiment.

The display control of the present embodiment is performed by a search process of Steps S5 through S7 as illustrated in FIG. 11. It is noted that the search process of the present embodiment is supposed to be started by a predetermined operation from the keyboard D or by a search dialog displayed on the display B, other methods may be used to start the search process.

As the search process of the present embodiment is started as described above, the display control searches a frame of an event in which a condition changes as exemplified above based on an analysis result of the analysis unit (106) in Step S5. In a case where there exists a plurality of search results here, they are stored as a list. Thereby, a search process can be made by using the stored list in a next search.

If there is a corresponding frame in Step S6, the closest frame from the frame being displayed on the event display area (108, 201 through 203) is selected to move to the selected frame in Step S7. Then, the condition of the 3D model of the robotic system is displayed by the frame on the 3D model display area 107. Still further, in linkage with that, the display of the event display area (108, 201 through 203) is automatically scrolled or a display factor is automatically changed such that the position in which the event has changed within the display area. If there is no corresponding frame in which the condition changes in Step S6, the search process is finished.

As described above, it is possible to move to the frame of the event in which the condition of the analysis result changes before or after the present frame on the event display area (108, 201 through 203) and the 3D model display area 107 which are linked with each other. That is, the user can specify the anterior or posterior warning event in terms of the time series based on the predetermined operation and can display on the 3D model display area 107 serving as the operation display area and the event display area 108 serving as information display area. Accordingly, the user can intuitively judge the presence of the warning event related to the operation of the robotic system being verified and can conduct the verification works or the editing works of the robot control data reliably and very efficiently without omission of confirmation.

Note that it is desirable to set such that a direction of the search is movable in both directions of the past and the future (anterior and posterior) in the time base operating the model of the robotic system. Then, in a case where a dialog of starting the search process in FIG. 11 is displayed on the display B, it is preferable to arrange such that a "search direction" can be specified to the past or the future (anterior or posterior).

In a case where the list of the events (or frames) searched as described above already exists, a display window or a display tab displaying the list in a table format or a graph format may be displayed on the display B. Such list display in the table format or the graph format enables the user to look at and to readily confirm how often, how many and with which period the noticed warning events occur.

The list display of the table format or the graph format can be used as a dialog for searching an event. For example, a display state of a 3D model of the robotic system on the 3D model display area 107 is updated by the event concerned by specifying a specific warning event or non-warning event included in the list display by the mouse C or the like. Such operative display control enables the user to grasp the behavior of the 3D model of the robotic system being verified very minutely.

FIG. 12 illustrates a control of searching a change of an event while displaying an operation of the 3D model of the robotic system on the 3D model display area 107 in animation (moving image) and of stopping the animation at that position (stops motion or displays a still image).

In a case where the operation of the 3D model of the robotic system is displayed (played back) on the 3D model display area 107, there is a case where the operation is displayed while decimating frames (a so-called frame drop) depending on setting of playback speed and on a hardware restriction. A part or a robotic system causing interference (collision) or the like may be highlighted (by changing display color, brightness, density and others) on the 3D model display area 107 as disclosed in a prior art. However, in the case where the animation (moving image) is displayed accompanying with the abovementioned frame drop on the 3D model display area 107, there is a possibility that the highlight of the warning event that appears only in one or several frames is omitted.

Then, the control procedure in FIG. 12 searches a frame in which an event changes from all frames, and if a corresponding frame exists, updates the display of the 3D model display area 107 to display the frame concerned and stops at the display concerned. This arrangement makes it possible for the user to confirm the frame in which the event changes, e.g., the frame that corresponds to the warning event, reliably even if the animation (moving image) display is made on the 3D model display area 107.

In FIG. 12, as the playback of the animation on the 3D model display area 107 is specified, a frame to be drawn next to a frame being displayed is set in Step S8. This process is executed such that image data to be drawn next assigned to a specific area within a specific storage unit 105 specifies a drawn fame buffer. Normally, two or more frame buffers are disposed in the storage unit 105 and are arranged such that during when reading (display in Step S13) is made in one frame buffer, the other frame buffer draws a succeeding frame.

In the present embodiment, a search (Steps S9 and S10) of the corresponding frame in which the event to be searched changes is made by utilizing a section (Steps S8 through S13) from the frame being displayed presently until when a next frame is displayed on the display B. That is, the corresponding frame in which the event to be searched changes is searched in Step S9 and if there is no corresponding frame, the process shifts to Step S13 to update the display of the 3D model display area 107 by using the frame set in Step S8.

If no frame corresponding to the change of the event is searched by the search between the frames (Steps S9 and S10) after Step S8, the animation (moving image) display is displayed to an end of the operation with a loop of returning to Step S8 through Steps S13 and S14 (judging the final operation). In a case where the final display frame has been displayed in Step S14, the animation (moving image) display is stopped in Step S12.

Meanwhile, if the frame corresponding to the change of the event to be searched is searched in Step S10, a transition is made from Step S10 to Step S11. In Step S11, the display of the 3D model display area 107 is updated by using not the "next frame" set in Step S8 but the searched frame generating the change of the event. Then, the animation (moving image) display is stopped while keeping this frame as a still image display in Step S12.

As described above, according to the control procedure as illustrated in FIG. 12, in the case of making the animation (moving image) display on the 3D model display area 107, it is possible to search the frame corresponding to the change of the event in a direction of a succeeding frame by using the section between the display frames and to stop the animation while displaying the frame. Therefore, in the case where the animation (moving image) display is made on the 3D model display area 107, this arrangement makes it possible for the user to confirm the frame in which the event changes, e.g., the frame corresponding to the warning event, reliably even in a state in which the frame drop occurs. Accordingly, the user can intuitively judge the presence of the warning event related to the operation of the robotic system being verified and can conduct the verification works or the editing works of the robot control data reliably and very efficiently without omission of confirmation.

Here, a more specific exemplary configuration of the robotic system operated by the robot control data (the teaching point data and the robot program) verified by the simulator system in FIGS. 1 and 2 and a configuration in a case where a robot arm is applied to a production system will be described.

Figure 13:
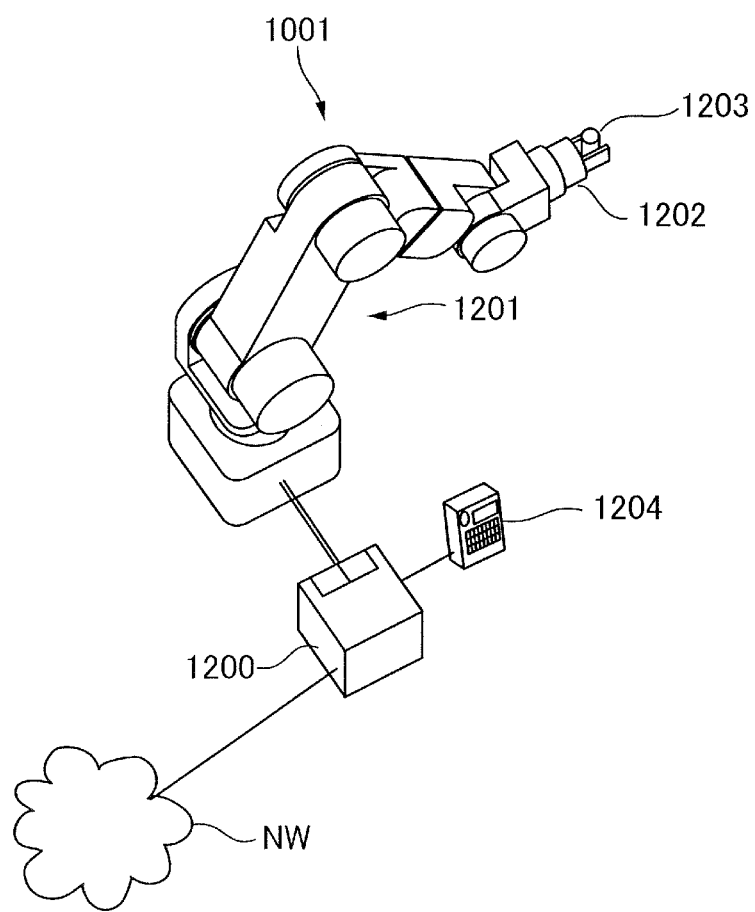
FIG. 13 illustrates a robotic system for manufacturing articles operated by robot control data verified by the simulator system of the present disclosure.

FIG. 13 illustrates an entire configuration of a robotic system 1001 operated by the robot control data (the teaching point data and the robot program) verified by the simulator system of FIGS. 1 and 2. In FIG. 13, the robotic system 1001 includes a six-axial (joint) vertically articulated robot arm body 1201 for example. Each joint of the robot arm body 1201 can be controlled to a desirable position and orientation by making servo control by a servo motor provided in each joint.

A tool such as a hand 1202 is attached at a distal end of the robot arm body 1201. This hand 1202 enables to conduct production works of grasping a work 1203, combining the works 1203 and machining the works 1203. The work 1203 is a component part for example of an industrial product such as an automobile and electronic product, and the robotic system 1001 can be disposed as a production unit of such production system (production line).

An operation of the robot arm body 1201 of the robotic system 1001 is controlled by a robot controller 1200. Robot control data of the robotic system 1001 can be programmed (taught) by an operation terminal 1204, e.g., a teaching pendant or a tablet terminal, connected to the robot controller 1200. It is also possible to additionally edit the data to make small revisions. The simulator system in the embodiments described above may be configured to be communicable with the robot controller 1200 with either form of radio and wire. Still further, while the simulator system is provided separately from these operation terminals and the robot controller 1200 in the embodiments described above, the simulation software described above may be installed in the operation terminals and the robot controller 1200 to make these operation terminals and the robot controller 1200 themselves as simulator systems. In a case where the simulation software is installed in the operation terminal in particular, it is also desirable to incorporate the display unit in the same time.

The robotic system 1001 or the robot controller 1200 can receive the optimized robot control data or trajectory data from the simulator system as illustrated in FIGS. 1 and 2 as described above through a network NW. This configuration makes it possible to operate the robotic system 1001 as a production unit composing a production system (production line) based on the robot control data optimized by the abovementioned process and to manufacture articles by the robotic system 1001.

The present disclosure can be realized also by a process by which a program realizing one or more functions of the embodiments described above is supplied to the system or the apparatus through a network or a storage medium and by which one or more processors in a computer of the system or the apparatus reads and executes the program. It is also possible to realize by a circuit, e.g., ASIC, realizing one or more functions.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-Ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-006044, filed Jan. 18, 2018, which is hereby incorporated by reference herein in its entirety.

What is claimed is:

1. An information processing apparatus comprising:
a display controller configured to output display information to be displayed on a display apparatus, the display apparatus having an operation display area displaying an operation of a robotic system which is simulatively operated within a virtual environment based on robot control data and an information display area displaying information related to an operation parameter of the robotic system in a time-series manner based on the robot control data; and
an analysis unit configured to analyze the operation parameter to specify a warning event,
wherein the display controller is configured to update the operation display area and the information display area in response to a predetermined operation of a user from a state in which the operation display area and the information display area respectively display a condition of the robot system at a certain timing on the time-series to a state in which the operation display area and the information display area respectively display a condition of the robot system at a timing of an anterior or posterior warning event closest to the certain timing on the time series.

2. The information processing apparatus according to claim 1, wherein the display controller displays the warning event with a different display manner corresponding to a type and a stage of the warning event.

3. The information processing apparatus according to claim 1, further comprising an operating unit,
wherein the display controller updates a display state of one of the operation display area and the information display area corresponding to an operation made to the other one of the operation display area and the information display area through the operating unit.

4. The information processing apparatus according to claim 1, wherein the information processing apparatus displays an operation of the robotic system in animation based on the robot control data and stops the animation on timing of an occurrence of the warning event.

5. A manufacturing method for manufacturing articles by causing a robotic system to execute an operation verified by using the information processing apparatus as set in claim 1.

6. The information processing apparatus according to claim 1, wherein the predetermined operation of a user includes first and second operations,
wherein the display controller is configured to update the operation display area and the information display area in response to the first operation of a user from the state in which the operation display area and the information display area respectively display the condition of the robot system at the certain timing on the time-series to a state in which the operation display area and the information display area respectively display a condition of the robot system at a timing of an occurrence of a warning event anterior and closest to the certain timing on the time-series, and
wherein the display controller is configured to update the operation display area and the information display area in response to the second operation of a user from the state in which the operation display area and the information display area respectively display the condition of the robot system at the certain timing on the time-series to a state in which the operation display area and the information display area respectively display a condition of the robot system at a timing of an occurrence of a warning event posterior and closest to the certain timing on the time-series.

7. The information processing apparatus according to claim 1, wherein the analysis unit is configured to analyze the operation parameter to specify a plurality of warning events,
wherein the display controller is configured to update the operation display area and the information display area in response to a predetermined operation of a user from a state in which the operation display area and the information display area respectively display a condition of the robot system at a certain timing on the time-series to a state in which the operation display area and the information display area respectively display a condition of the robot system at a timing of an occurrence of a warning event closest to the certain timing before or after the certain timing on the time-series among the plurality of warning events.

8. A control method of a display apparatus displaying, in an operation display area of the display apparatus, a model of a robotic system operated in a virtual environment by operating the model simulating the robotic system based on robot control data, the control method comprising:
displaying, in an information display area of the display apparatus, information related to an operation parameter of the robotic system based on the robot control data in a time-series manner;
analyzing the operation parameter to specify a warning event; and
updating the operation display area and the information display area in response to a predetermined operation of a user from a state in which the operation display area and the information display area respectively display a condition of the robot system at a certain timing on the time-series to a state in which the operation display area and the information display area respectively display a condition of the robot system at a timing of an anterior or posterior warning event closest to the certain timing on the time series.

9. A non-transitory computer readable medium storing a program controlling a display apparatus by the control method as set forth in claim 8.

* * * * *